(12) United States Patent
Schmaling et al.

(10) Patent No.: US 9,441,495 B2
(45) Date of Patent: Sep. 13, 2016

(54) ROTARY WING AIRCRAFT PITCH BEAM ATTACHMENT WITH ANTI-ROTATION PLATE DESIGN

(71) Applicant: Sikorsky Aircraft Corporation, Stratford, CT (US)

(72) Inventors: David N. Schmaling, Southbury, CT (US); Richard Thomas Hood, Fairfield, CT (US); Evan Sobel, Stratford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 725 days.

(21) Appl. No.: 13/778,741

(22) Filed: Feb. 27, 2013

(65) Prior Publication Data
US 2014/0241884 A1 Aug. 28, 2014

(51) Int. Cl.
| | |
|---|---|
| *F01D 7/00* | (2006.01) |
| *F16D 1/108* | (2006.01) |
| *B64C 27/82* | (2006.01) |
| *F16D 1/10* | (2006.01) |

(52) U.S. Cl.
CPC ............... *F01D 7/00* (2013.01); *B64C 27/82* (2013.01); *F16D 1/108* (2013.01); *F16D 2001/103* (2013.01); *Y10T 29/49321* (2015.01)

(58) Field of Classification Search
CPC ... F16D 1/108; F16D 2001/13; B64C 27/82; B64C 11/001; B64C 11/06; F01D 7/00; Y10T 29/49321
USPC ..................................................... 416/240 R
See application file for complete search history.

(56) References Cited

U.S. PATENT DOCUMENTS

| | | | | |
|---|---|---|---|---|
| 1,229,783 A | | 6/1917 | Pogue | |
| 1,928,109 A | * | 9/1933 | McCormick | B60K 25/06 411/927 |
| 3,123,169 A | * | 3/1964 | Young | F16D 43/02 180/244 |
| 3,533,713 A | * | 10/1970 | Salmun | B64C 27/322 416/140 |

(Continued)

FOREIGN PATENT DOCUMENTS

| | | |
|---|---|---|
| EP | 2123557 A1 | 11/2009 |
| EP | 2392477 A2 | 7/2011 |
| GB | 371166 A | 4/1932 |

OTHER PUBLICATIONS

European Search Report for application EP14156354.4, mailed Jul. 3, 2014, 8 pages.

*Primary Examiner* — Mary A Davis
(74) *Attorney, Agent, or Firm* — Cantor Colburn LLP (57) ABSTRACT

A retaining assembly for a tail rotor system is provided including a washer having a plurality of splines. The washer is configured to couple to an adjacent pitch change shaft. A retaining nut includes a self-locking feature and a flange arranged at a first end. The retaining nut is configured to threadably couple to the pitch change shaft such that the flange is in contact with the washer. The flange includes a plurality of first holes configured to at least partially align between the splines of the washer. A lock plate includes a body and a plurality of tabs extending generally perpendicularly from the body. The lock plate is slidably positioned about the pitch change shaft adjacent the flange. The lock plate is operably coupled to the retaining nut and the washer to limit rotational movement thereof relative to the pitch change shaft.

19 Claims, 5 Drawing Sheets

(56) References Cited

U.S. PATENT DOCUMENTS

| | | |
|---|---|---|
| 4,015,874 A | 4/1977 | Hennessy |
| 5,415,525 A | 5/1995 | Desjardins et al. |
| 5,478,204 A | 12/1995 | Desjardins et al. |
| 5,618,143 A | 4/1997 | Cronin, II et al. |
| 5,674,034 A | 10/1997 | Bennett |
| 6,976,816 B2 * | 12/2005 | Slesinski ............... F16B 39/103 411/120 |
| 6,976,817 B1 | 12/2005 | Grainger |
| 2011/0176925 A1 * | 7/2011 | Anderson ............. F01D 5/3015 416/221 |
| 2012/0082806 A1 * | 4/2012 | Kissell .................... C09D 5/24 428/34.1 |

* cited by examiner

ROTARY WING AIRCRAFT PITCH BEAM ATTACHMENT WITH ANTI-ROTATION PLATE DESIGN

BACKGROUND OF THE INVENTION

This invention relates to rotary wing aircrafts and, more particularly, to a retaining assembly for a pitch control system of a rotary wing aircraft.

Conventional rotary wing aircrafts, such as helicopters for example, generally include a tail rotor configured to create aerodynamic thrust to compensate for the rotor torque generated by a main rotor. The tail rotor includes a tail rotor hub having multiple rotor blades mounted thereto. Arranged adjacent the tail rotor is a pitch control system including a pitch beam attached to an end of the pitch change shaft. The pitch beam has multiple arms, each of which is coupled to a corresponding tail rotor blade through a pitch linkage. A dual stage servo provides axial movement of the pitch change shaft relative to a tail rotor hub, thereby manipulating the rotational displacement of the rotor blades.

A retaining assembly including a torque reacting washer and a retaining nut, is used to prevent linear movement of the pitch beam relative to the pitch change shaft. Self-locking inserts of the retaining nut provide a first locking feature and locking fasteners configured to mechanically couple the retaining nut to the washer provide a second locking feature of the retaining assembly. Despite both of these locking features, potential for improper installation of the retaining assembly exists, for example by improperly engaging the washer with the pitch change shaft. As a result of improper installation, vibrations generated by the rotation of the tail rotor may cause an improperly torqued retaining assembly to loosen or ultimately separate from the pitch change shaft.

BRIEF DESCRIPTION OF THE INVENTION

According to one embodiment of the invention, a retaining assembly for a tail rotor system is provided including a washer having a plurality of splines. The washer is configured to couple to an adjacent pitch change shaft. A retaining nut includes a self-locking feature and a flange arranged at a first end. The retaining nut is configured to threadably couple to the pitch change shaft such that the flange is in contact with the washer. The flange includes a plurality of first holes configured to at least partially align between the splines of the washer. A lock plate includes a body and a plurality of tabs extending generally perpendicularly from the body. The lock plate is slidably positioned about the pitch change shaft adjacent the flange. The lock plate is operably coupled to the retaining nut and the washer to limit rotational movement thereof relative to the pitch change shaft.

According to another embodiment of the invention, a tail rotor system is provided including a tail rotor hub configured to rotate about an axis. A plurality of tail rotor blades extends from the tail rotor hub. A pitch change shaft extends from the tail rotor hub about the axis. The pitch change shaft is configured to translate relative to the tail rotor hub. A pitch beam is coupled to a distal end of the pitch change shaft. The pitch beam includes a plurality of arms. Each arm is operably coupled to one of the plurality of tail rotor blades to adjust the pitch thereof. The tail rotor system also includes a retaining assembly configured to couple to the distal end of the pitch change shaft. The retaining assembly includes a washer, a retaining nut, and a lock plate. The washer has a plurality of splines. The washer is configured to couple to an adjacent pitch change shaft. A retaining nut includes a self-locking feature and a flange arranged at a first end. The retaining nut is configured to threadably couple to the pitch change shaft such that the flange is in contact with the washer. The flange includes a plurality of first holes configured to at least partially align between the splines of the washer. A lock plate includes a body and a plurality of tabs extending generally perpendicularly from the body. The lock plate is slidably positioned about the pitch change shaft adjacent the flange. The lock plate is operably coupled to the retaining nut and the washer to limit rotational movement thereof relative to the pitch change shaft.

According to yet another embodiment of the invention, a method of installing a retaining assembly of a tail rotor system is provided including positioning a washer about a first end of a pitch change shaft. A retaining nut is coupled to the first end of the pitch change shaft such that a flange of the retaining nut is in contact with the washer. A lock plate is arranged about the first end of the pitch change shaft in contact with the flange of the retaining nut. A portion of first holes in the lock plate is generally aligned with a portion of second holes in the flange. The lock plate is operably coupled to the retaining nut and the washer.

According to yet another embodiment of the invention, a lock plate is provided including a generally cylindrical body having a central hole and a plurality of substantially identical holes formed about a periphery of the cylindrical body. At least one tab extends generally perpendicularly from the body. The at least one tab includes a bend radius. A corner of a free end of the tab is generally rounded.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
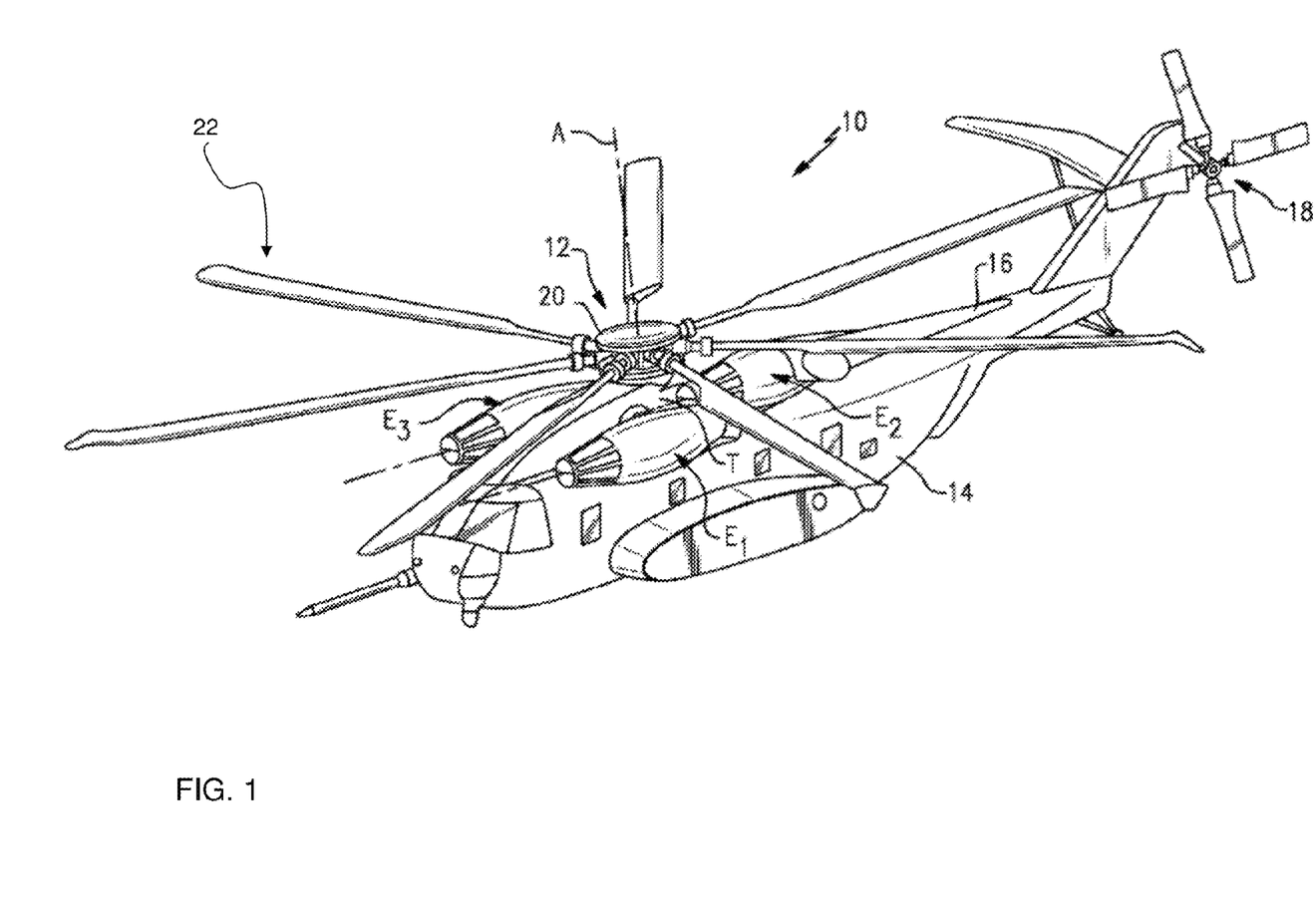
FIG. 1 is a perspective view of an exemplary rotary wing aircraft.

FIG. 1 schematically illustrates a rotary-wing aircraft 10 having a main rotor system 12. The aircraft 10 includes an airframe 14 having a tail 16 extending therefrom which supports a tail rotor system 18, such as an anti-torque system. The main rotor assembly 12 is driven about an axis of rotation A through a main gearbox (illustrated schematically at T) by one or more engines E. The main rotor system 12 includes multiple rotor blade assemblies 22 mounted to a rotor hub 20. Although a particular rotary wing aircraft configuration is illustrated and described in the disclosed non-limiting embodiment, other configurations and/or machines, such as high speed compound rotary wing aircraft with supplemental translational thrust systems, dual contra-rotating coaxial rotor system aircraft, turboprops, tilt-rotors, and tilt-wing aircraft, will also benefit from the present invention.

Figure 2:
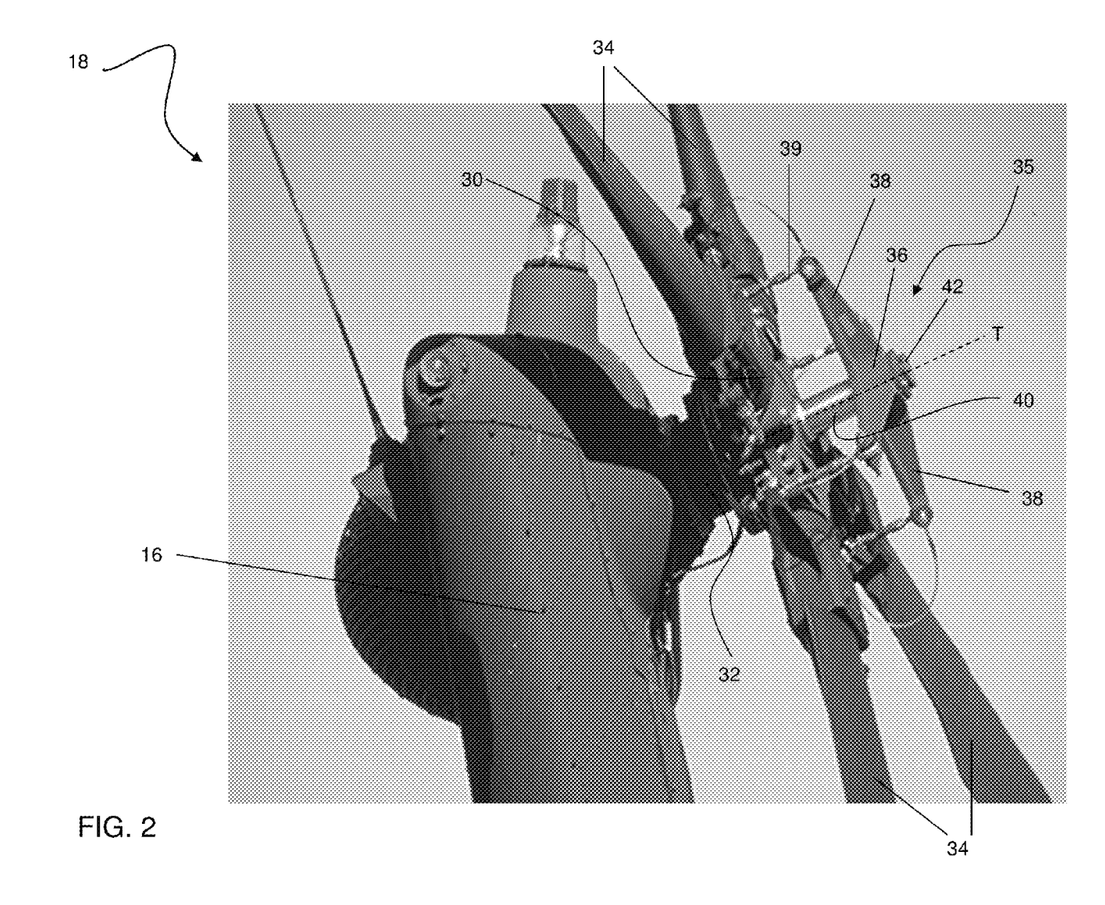
FIG. 2 is a detailed perspective view of a tail rotor according to an embodiment of the invention.

Referring now to FIG. 2, the tail rotor system 18 is illustrated in more detail. The tail rotor system 18 includes a tail rotor hub 30 configured to rotate about a rotational axis T of a first shaft 32. Multiple tail rotor blades 34 are connected to the tail rotor hub 30 and extend generally outwardly therefrom. The tail rotor 18 additionally includes a pitch control system 35 for varying the pitch of each tail rotor blade 34. Arranged substantially parallel to the tail rotor hub 30 is a pitch beam 36 having a plurality of arms 38 that may be equal in number to the plurality of tail rotor blades 34. The pitch beam 36 is located at a distal end 42 of a pitch change shaft 40 such that a distance exists between the tail rotor hub 30 and the pitch beam 36. The pitch change shaft 40 is configured to translate along axis T to vary the distance between the tail rotor hub 30 and the pitch beam 36. In addition, the pitch change shaft 40 is generally configured to rotate with the tail rotor hub 30; however, the pitch change shaft 40 may be selectively decoupled from the first shaft 32 to rotate the pitch beam 36 independently from the tail rotor hub 30 about axis T. Each arm 38 of the pitch beam 36 is operably coupled to an adjacent tail rotor blade 34, such as through a pitch linkage 39 for example. Translation or rotation of the pitch change shaft 40 causes the pitch beam 36 to move relative to the tail rotor hub 30 such that the pitch of the plurality of tail rotor blades 34 coupled thereto is affected.

Figure 3:
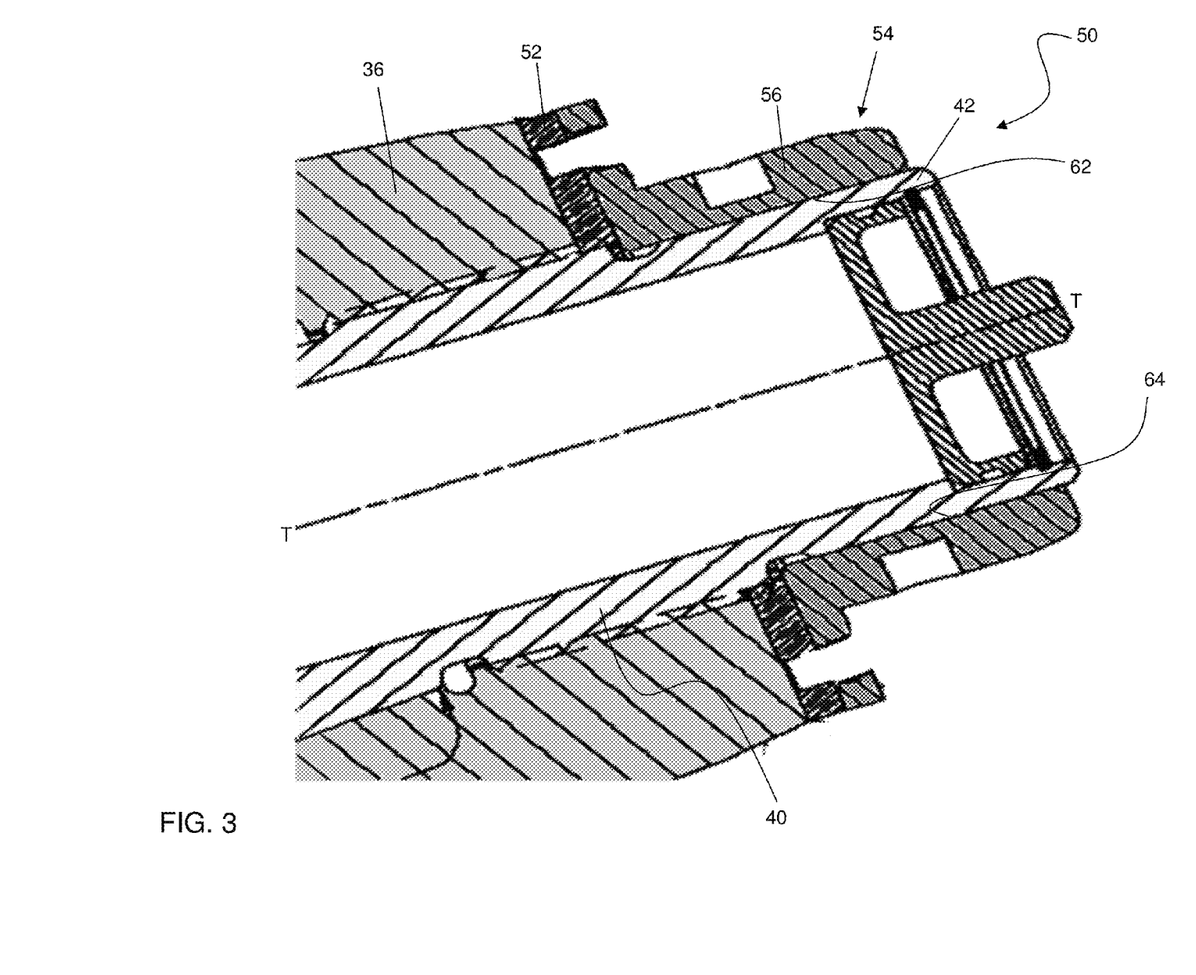
FIG. 3 is a cross-sectional view of a portion of a pitch control system of tail rotor according to an embodiment of the invention.
Figure 4:
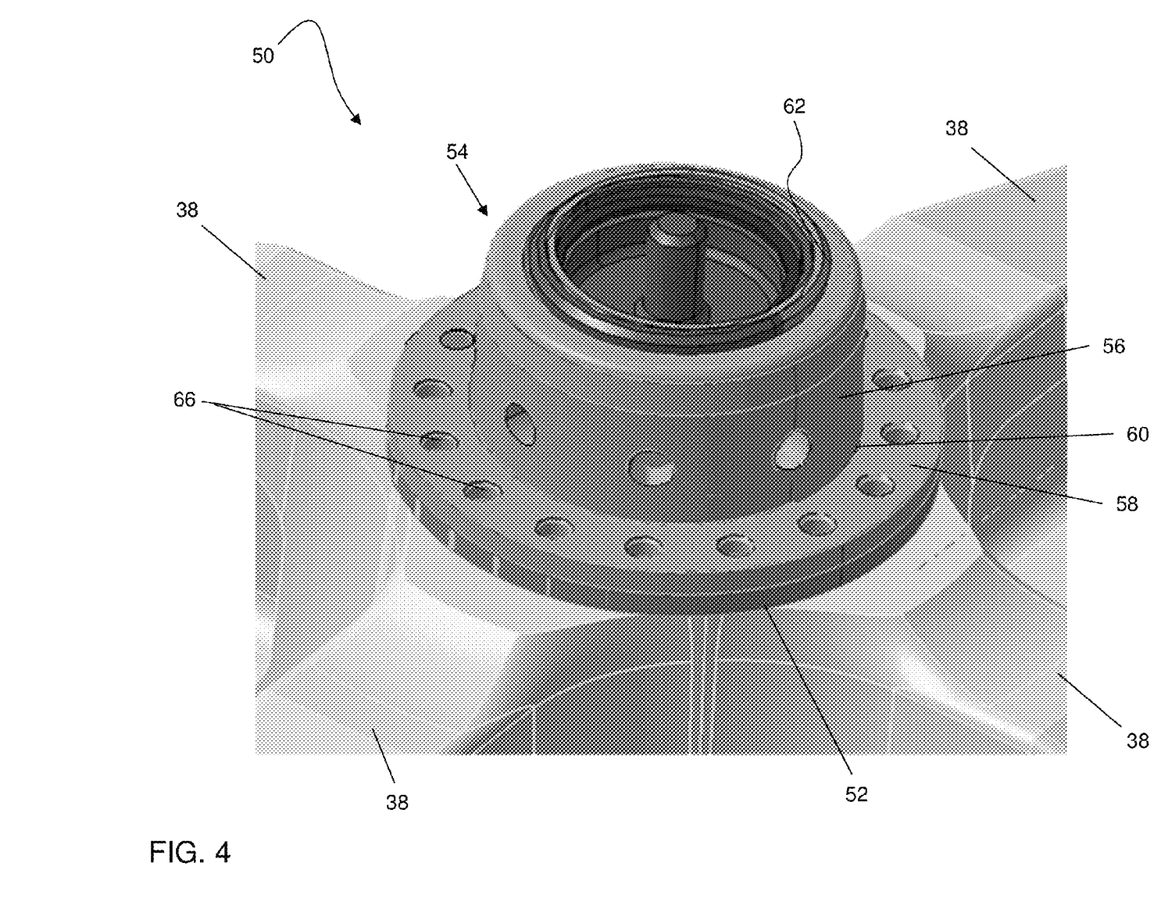
FIG. 4 is a perspective view of a portion of a pitch control system of tail rotor according to an embodiment of the invention.
Figure 5:
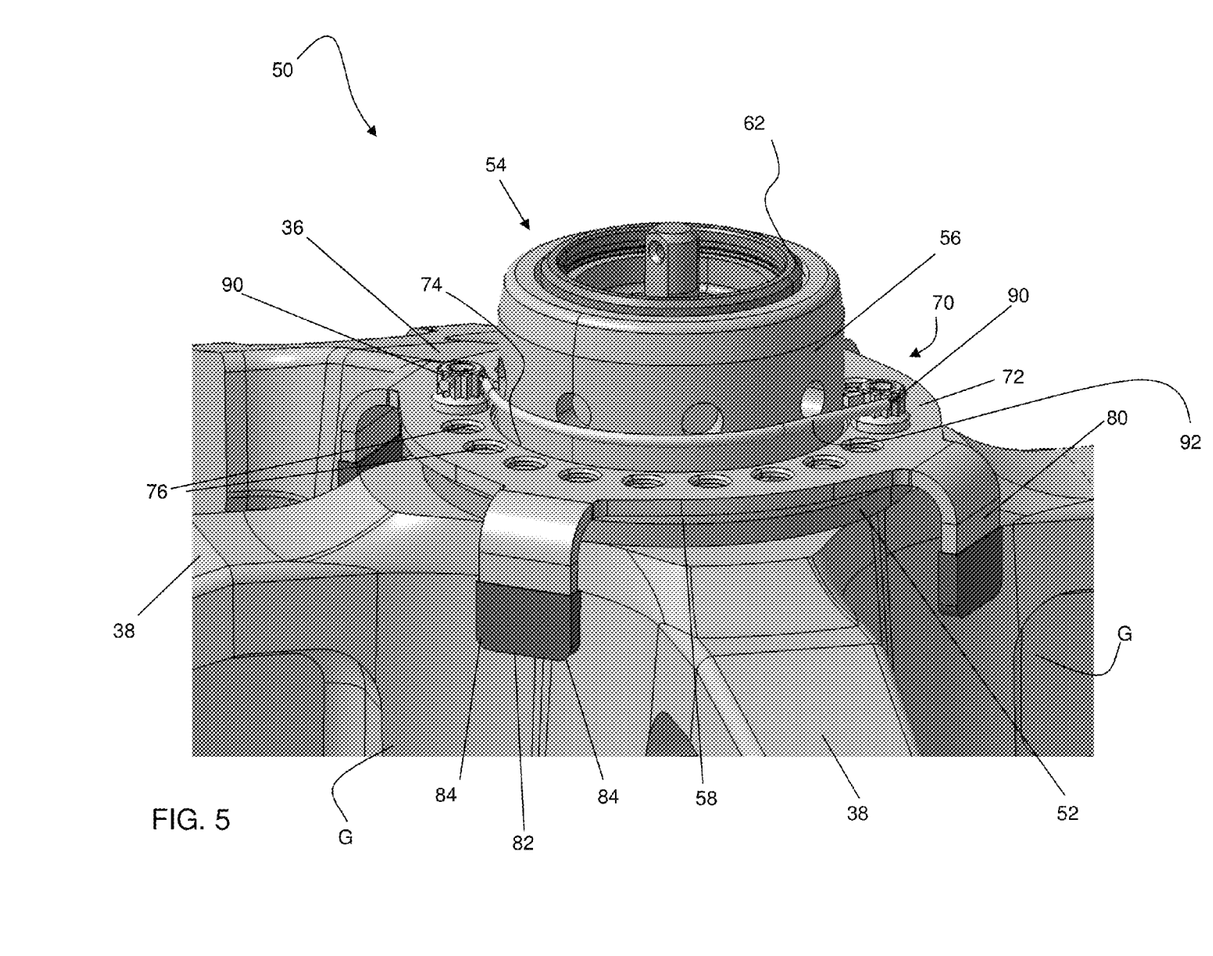
FIG. 5 is a perspective view of a portion of a pitch control system of tail rotor according to an embodiment of the invention.

Referring now to FIGS. 3-5, the pitch change shaft 40 and pitch beam 36 of the pitch control system 35 is illustrated in more detail. In one embodiment, the pitch beam 36 is made from an aluminum material and the pitch change shaft 40 is fabricated from a steel material. The pitch beam 36 is rigidly connected to the pitch change shaft 40, such as with a keyway or a spline for example, to prevent any rotation of the pitch beam 36 relative to the pitch change shaft 40. A retaining assembly 50 is mounted at the end 42 of the pitch change shaft 40 to limit translation of the pitch beam 36 relative to the pitch change shaft 40 in a first direction. The retaining assembly 50 includes a washer 52 and a retaining nut 54 arranged generally collinearly about axis T. The washer 52 is positioned in contact with an adjacent surface of the pitch beam 36. In one embodiment, the washer 52 is a splined washer such that a portion of the washer 52, for example a spline, engages a complementary portion of the pitch change shaft 40 to prevent rotation of the pitch change shaft 40 relative to the washer 52.

The retaining nut 54 is positioned directly adjacent the washer 52 about the distal end 42 of the pitch change shaft 40. In one embodiment, the retaining nut 54 includes a self-locking feature, such as inserts or plugs for example, when a torque is applied thereto. The retaining nut 54 has a generally cylindrical body 56 with a flange 58 extending from a first end 60 thereof. The body 56 includes a central opening 62 such that a plurality of threads (not shown) are formed about an interior surface 64 of the body 56. The plurality of threads formed in the retaining nut 54 are configured to couple to a plurality of complementary threads (not shown) near the end 42 of pitch change shaft 40. When the retaining nut 54 is installed on the pitch change shaft 40, the flange 58 contacts a surface of the washer 52, opposite the pitch beam 36. In one embodiment, the flange 58 has a diameter substantially equal to the diameter of the washer 52. A plurality of substantially identical holes 66 are equidistantly spaced about the flange 58 (see for example, FIG. 4). The holes 66 extend through the thickness of the flange 58 and are configured to generally align between the splines (not shown) of the washer 52.

Referring now to FIG. 5, the retaining assembly 50 further includes a lock plate 70. The lock plate 70 plate has a thin, cylindrical body 72, similar to the washer 52 and the flange 58 of the retaining nut 54. Formed within the body 72 is a central hole 74 such that the lock plate 70 is configured to slide over the body 56 of the retaining nut 54 and contact the surface of the flange 58 opposite the washer 52. A plurality of equidistantly spaced holes 76 are formed about the periphery of the cylindrical body 72. The holes 76 may, but need not be, similar in size to the holes 66 in the flange 58 of the retaining nut 54. In one embodiment, the number of holes 76 formed in the lock plate 70 is greater than the number of holes 66 formed in the flange 58 of the retaining nut 54 to prevent improper installation of the retaining assembly 50.

The lock plate 70 includes at least one tab 80 extending generally perpendicularly from the body 72 thereof, for example in the direction of the pitch beam 36 and tail rotor hub 30. The number of tabs 80 may be substantially equal to the number of arms 38 of the pitch beam 36 such that each tab 80 is positioned within a gap G formed between two adjacent arms 38. In one embodiment, the tabs 80 are integrally formed with the body 72 of the lock plate. Each tab 80 is formed with a bend radius such that a surface of the tabs 80 does not contact a generally curved surface connecting two adjacent arms 38. The corners 84 of the free end 82 of each tab 80 may be generally rounded to prevent damage to the pitch beam 36 if contact between a tab 80 and one of the arms 38 occurs. In one embodiment, at least a portion of each tab 80 is covered with an abrasion resistant coating to protect the pitch beam 36 from damage in the event that the retaining nut 54 comes loose and the tabs 80 contact the arms 38 of the pitch beam 36. In addition, a portion of the lock plate 70, such as one of the plurality of tabs 80 or the body 72 for example, may include at least one marking (not shown) indicating the orientation of the lock plate 70 about the pitch change shaft 40 to ensure proper assembly thereof.

At least one locking fastener 90 is used to secure the lock plate 70 to the retaining nut 54 and the washer 52. In embodiments having multiple locking fasteners 90, a wire 92 may extend between the plurality of locking fasteners 90 to prevent them from loosening due to the vibration of the pitch change shaft 40. Each locking fastener 90 is configured to extend through a hole 76 in the lock plate 70, an aligned hole 66 in the flange 58 of the retaining nut 54, and between splines of the washer 52.

To install the retaining assembly 50 on a coupled pitch beam 36 and pitch change shaft 40, the washer 52 is slidably positioned about the pitch change shaft 40 such that the washer 52 is in contact with the pitch beam 36. The retaining nut 54 is then coupled to the end 42 of the pitch change shaft 40 such that the flange 58 of the retaining nut 54 is in contact with the washer 52. A torque is applied to the retaining nut 54 to prevent rotation of the washer and the retaining nut 54 about the pitch change shaft 40, such as when the washer is installed incorrectly for example. When installed, at least a portion of the holes 66 of the flange 58 are aligned between the splines of the washer 52. The lock plate 70 is then slidably positioned about the pitch change shaft 40 such that the body 72 of the lock plate 70 is engaged with the flange 58 of the retaining nut 54. In addition, each of the plurality of tabs 80 is positioned between adjacent arms 38 of the pitch beam 36, extending towards the tail rotor hub 30. Because the lock plate 70 has a greater number of holes 76 than the flange 58 of the retaining nut 54, only a portion of the holes 76 of the lock plate 70 will align with the holes 66 of the flange 58. A locking fastener 90 is inserted into at least one pair of aligned holes 66, 76. A predetermined torque is applied to the locking fastener 90 to prevent loosening thereof.

The retaining assembly 50 described herein includes three distinct locking features to prevent loosening thereof as a result of vibration in the pitch change shaft 40. These locking features include the self-locking inserts on the retaining nut 54, the locking fasteners 90 that couple the retaining nut 54 to the washer 52, and the tabs 80 of the lock plate 70 that limit rotation of the retaining assembly 50 about the pitch change shaft 40. The redundancy of these locking features provides a more reliable and mistake-proof retaining assembly 50. Also, the lock plate 70 provides a lightweight, inexpensive, and reliable means to additionally limit rotation of the retaining nut 54.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A retaining assembly for a tail rotor system, comprising:
    a washer including a plurality of splines, the washer being configured to couple to a pitch change shaft;
    a retaining nut including a self-locking feature and a flange arranged at a first end, the retaining nut being configured to threadably couple to the pitch change shaft such that the flange is in contact with the washer, wherein the flange includes a plurality of first holes configured to at least partially align between the splines of the washer; and
    a lock plate including a body and a plurality of tabs extending generally perpendicularly from the body and extending exteriorly past an outer periphery of the flange and an outer periphery of the washer, the lock plate being slidably positioned about the pitch change shaft adjacent the flange, wherein the lock plate is operably coupled to the retaining nut and the washer to limit rotational movement thereof about the pitch change shaft.

2. The retaining assembly according to claim 1, wherein a plurality of locking fasteners operably couples the lock plate to the retaining nut and the washer.

3. The retaining assembly according to claim 2, wherein a wire extends between the plurality of locking fasteners.

4. The retaining assembly according to claim 1, wherein the body of the lock plate further comprises a plurality of second holes.

5. The retaining assembly according to claim 4, wherein the plurality of first holes is generally less than the plurality of second holes.

6. The retaining assembly according to claim 5, wherein each of the plurality of first holes is substantially similar in size to each of the plurality of second holes.

7. The retaining assembly according to claim 1, wherein at least a portion of the plurality of tabs include an abrasion resistant coating.

8. The retaining assembly according to claim 1, wherein at least one corner at a free end of each tab is generally rounded.

9. The retaining assembly according to claim 1, wherein each of the plurality of tabs includes a bend radius such that a free end of each tab does not contact an adjacent surface.

10. A tail rotor system comprising:
    a tail rotor hub configured to rotate about an axis;
    a plurality of tail rotor blades extending from the tail rotor hub;
    a pitch change shaft extending from the tail rotor hub about the axis, the pitch change shaft being configured to translate relative to the tail rotor hub;
    a pitch beam disposed at a distal end of the pitch change shaft, the pitch beam including a plurality of arms, each of which is operably coupled to one of the plurality of tail blades to adjust the pitch thereof; and
    a retaining assembly configured to couple the pitch beam to the distal end of the pitch change shaft and including:
        a washer including a plurality of splines, the washer being configured to couple to the pitch change shaft;
        a retaining nut including a flange arranged at a first end, the retaining nut being configured to threadably couple to the pitch change shaft such that the flange contacts the washer, wherein the flange includes a plurality of first holes configured to at least partially align between the splines of the washer; and
        a lock plate including a body and a plurality of tabs extending generally perpendicularly from the body, each tab amongst the plurality of tabs extending exteriorly past an outer periphery of the flange and an outer periphery of the washer and within a respective gap between a pair of adjacent arms amongst the plurality of arms of the pitch beam, the lock plate being slidably positioned about the pitch change shaft adjacent the flange, wherein the lock plate is operably coupled to the retaining nut and the washer to limit rotational movement thereof about the pitch change shaft.

11. The tail rotor system according to claim 10, wherein the body of the lock plate further comprises a plurality of second holes.

12. The tail rotor system according to claim 11, wherein the plurality of first holes is generally less than the plurality of second holes.

13. The tail rotor system according to claim 11, wherein the plurality of first holes are substantially similar in size to the plurality of second holes.

14. The tail rotor system according to claim 10, wherein at least a portion of the plurality of tabs include an abrasion resistant coating.

15. The tail rotor system according to claim 10, wherein at least one corner at a free end of each tab is generally rounded.

16. The tail rotor system according to claim 10, wherein each of the plurality of tabs includes a bend radius such that a free end of each tab does not contact an adjacent surface.

17. A method of installing a retaining assembly of a tail rotor system, comprising:
    positioning a washer about a first end of a pitch change shaft;

coupling a retaining nut to the first end of the pitch change shaft such that a flange of the retaining nut is in contact with the washer;

positioning a lock plate about the first end of the pitch change shaft in contact with the flange of the retaining nut such that a portion of first holes in the lock plate is generally aligned with a portion of second holes in the flange, and such that a plurality of tabs of the lock plate extend exteriorly past an outer periphery of the flange and an outer periphery of the washer and are positioned respectively within a respective gap between a pair of adjacent arms of a pitch beam disposed on the pitch change shaft; and operably coupling the lock plate to the retaining nut and the washer.

18. The method according to claim 17, wherein a self-locking feature of the retaining nut is engaged when the retaining nut is coupled to the pitch change shaft.

19. The method according to claim 17, wherein a portion of the washer engages a complementary portion of the pitch change shaft to limit relative rotational movement.

* * * * *